(12) United States Patent
del Pinal et al.

(10) Patent No.: US 8,011,326 B2
(45) Date of Patent: Sep. 6, 2011

(54) CAT ATTRACTANT TOY

(75) Inventors: Erwin del Pinal, San Rafael, CA (US); Gary Lau, Shatin (HK)

(73) Assignee: Worldwise, Inc., San Rafael, CA (US)

( * ) Notice: Subject to any disclaimer, the term of this patent is extended or adjusted under 35 U.S.C. 154(b) by 165 days.

(21) Appl. No.: 12/368,468

(22) Filed: Feb. 10, 2009

(65) Prior Publication Data

US 2010/0199923 A1    Aug. 12, 2010

(51) Int. Cl.
*A01K 15/02*    (2006.01)
*A01K 29/00*    (2006.01)

(52) U.S. Cl. ...................................................... 119/707

(58) Field of Classification Search .................... 119/707
See application file for complete search history.

(56) References Cited

U.S. PATENT DOCUMENTS

| | | | | |
|---|---|---|---|---|
| 3,459,158 A * | 8/1969 | Mitchell, Jr. | ................. | 119/708 |
| 4,536,167 A * | 8/1985 | Hughes | ........................ | 446/396 |
| 5,045,014 A * | 9/1991 | Harkins | ........................ | 446/236 |
| 5,657,721 A * | 8/1997 | Mayfield et al. | ............. | 119/707 |
| 5,823,844 A * | 10/1998 | Markowitz | ..................... | 446/175 |
| D426,036 S * | 5/2000 | Willinger et al. | ............ | D30/160 |
| 6,684,819 B1 * | 2/2004 | Locke | .......................... | 119/707 |
| 6,902,464 B1 * | 6/2005 | Lee | ............................... | 446/456 |
| 6,990,762 B1 * | 1/2006 | Muday et al. | .................. | 40/409 |
| 2006/0266299 A1 * | 11/2006 | DiAntonio | ..................... | 119/708 |

* cited by examiner

*Primary Examiner* — Son T. Nguyen
(74) *Attorney, Agent, or Firm* — Bay Area Technology Law Group PC

(57) ABSTRACT

A cat toy in the form of a hollow spherical shell having an opening configured therein. A power supply is supported by the interior of said shell, and a spindle emanates from the power supply and extends toward the opening. An offset weighted element having a borehole configured therein is provided for receipt of the spindle, as is a motor for rotating the offset weighted element about said spindle. A shaft is included for attachment to the spindle which is sized to pass through the opening and which further supports an attractant external to the hollow spherical shell.

11 Claims, 3 Drawing Sheets

CAT ATTRACTANT TOY

TECHNICAL FIELD

The present invention involves a cat attracting toy capable of amusing and occupying a domestic cat for extended periods of time and without the need for significant human intervention.

BACKGROUND OF THE INVENTION

It is well known that pet cats require stimulation. Without it, they get bored which could result in health problems and associated unwelcome anti-social behavior. It is also well know to anyone owning a pet cat that they express a natural instinct to be almost mesmerized by moving objects. This stems from their instinctual need to chase prey. As such, cat owners often times dangle attractants in front of their pets observing as the pet swats and, even pounces upon it.

Others have recognized the need for a toy which could move an attractant, such as a feathered bundle in a somewhat haphazard path to provide stimulation. For example such a device is disclosed in U.S. Pat. No. 6,892,675. However, the device made the subject of the '675 patent is quite complex requiring extended feet to stabilize the device and a rotating shaft maintained in its own hollow housing to move the attractant. However, if a cat was to pounce on this device while tipping it from its vertical orientation, it would be incapable of functioning further until the pet owner, realizing that the device was knocked over, uprighted it for further use.

It is thus an object of the present invention to provide a cat attractant toy, particularly designed for use by cats which is simple to construct and operate, inexpensive to implement and yet is an improvement of similar toys currently available.

These and further objects will be more readily apparent when considering the following disclosure and appended claims.

SUMMARY OF THE INVENTION

A cat toy comprising a hollow spherical shell having an opening configured therein. A power supply is supported by the interior of said shell, and a spindle emanates from said power supply and extends toward the opening. An offset weighted element having a borehole configured therein is provided for receipt of the spindle, as is a motor for rotating the offset weighted element about said spindle. A shaft is included for attachment to the spindle which is sized to pass through the opening and which further supports an attractant external to the hollow spherical shell.

DETAILED DESCRIPTION OF THE INVENTION

Figure 1:
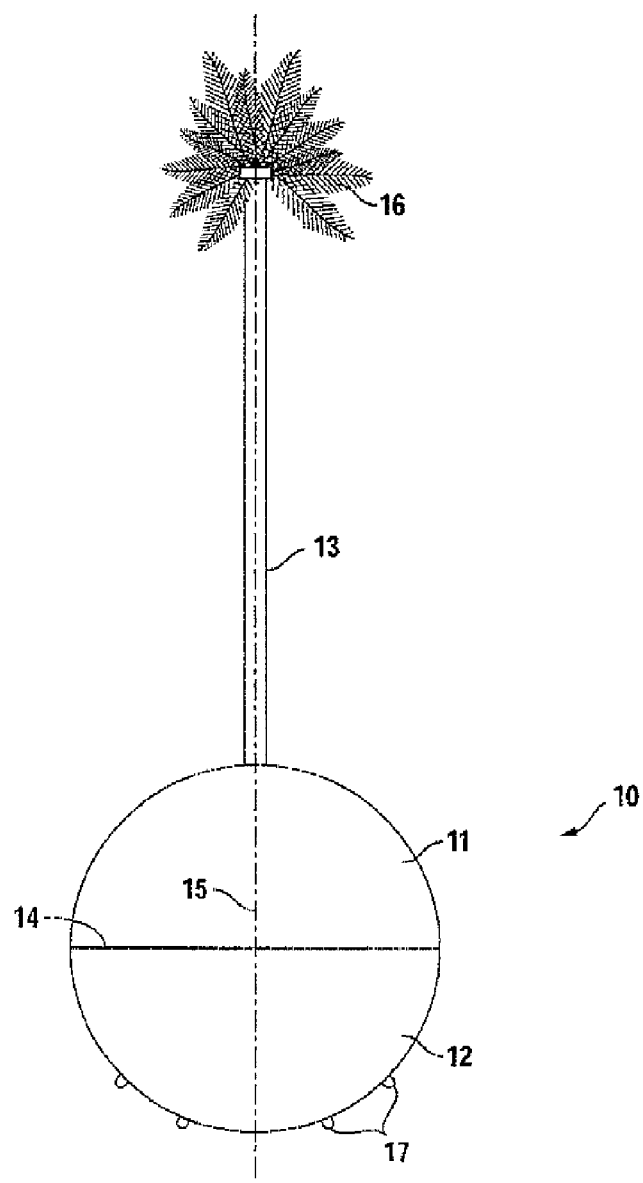
FIG. 1 is a side plan view of the cat attractant toy of the present inventions.
Figure 2:
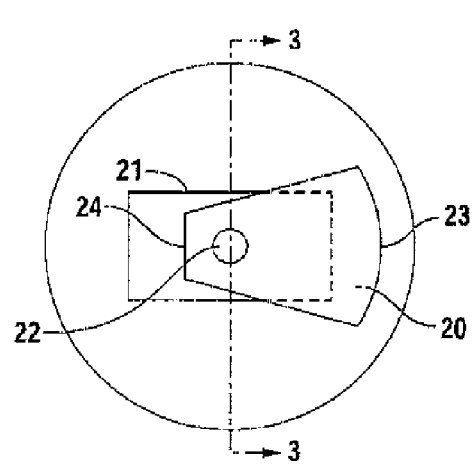
FIG. 2 is a top plan view of the interior components of the hollow spherical shell constituting the working elements of the present invention.

Turning first to FIG. 1, cat toy 10 is shown having a hollow spherical ball generally bisected into hemispheres 11 and 12 which are either screwed together or frictionally fit to create the spherical ball. The spherical ball is also characterized as having longitudinal axis 15 extending vertically when the spherical ball is at rest generally perpendicular to seam 14. Although not shown in FIG. 1, an opening in upper hemisphere 11 is configured through which longitudinal axis 15 extends to enable shaft 13 to extend from a position outside of the spherical ball to an interior location, the details of which will be described hereinafter.

Figure 3:
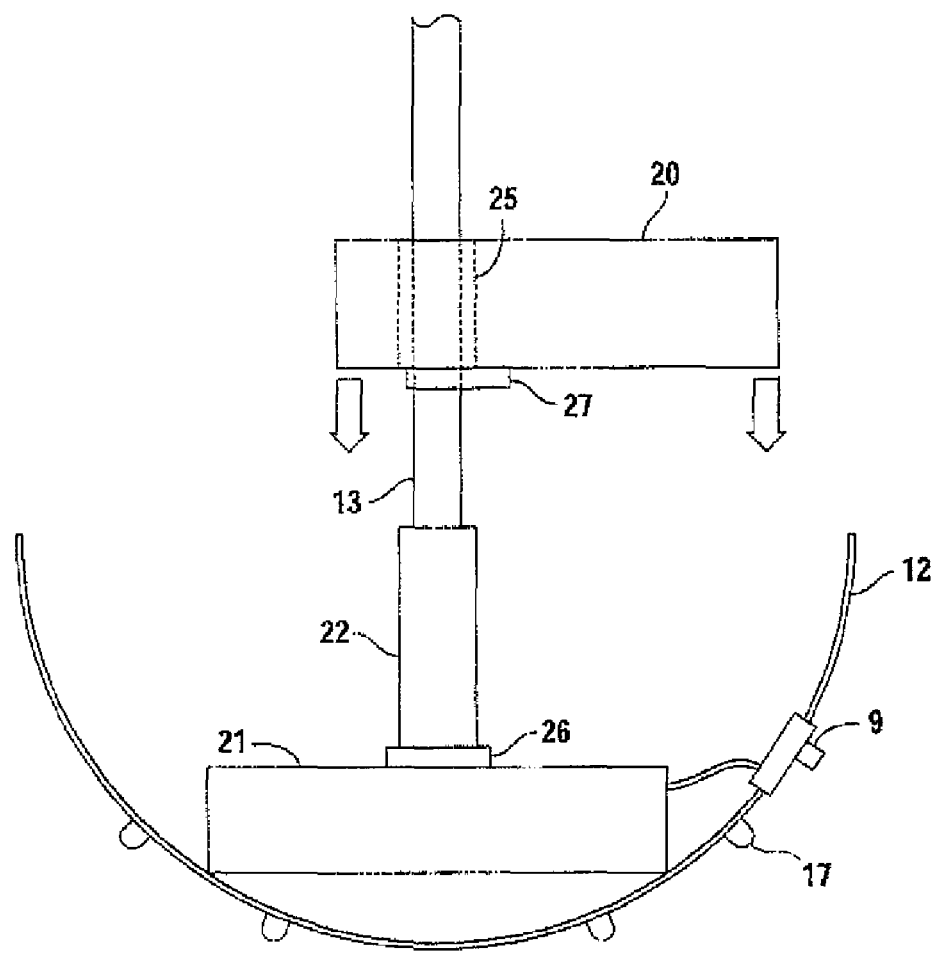
FIG. 3 is a cross-sectional view taken along section line 3-3 of FIG. 2.

Within lower hemisphere 12 is provided power supply 21, ideally a battery pack having an externally accessible on/off switch 9 (FIG. 3). It is noted that the power supply is supported by the interior of the spherical shell and is provided with spindle 22 emanating therefrom. At the base of spindle 22 is electrical connector 26 providing power from power supply 21 to a suitable motor within an offset weighted element.

Figure 4:
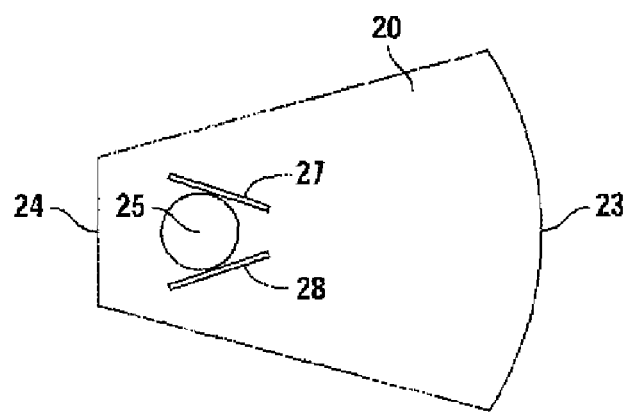
FIG. 4 is bottom plan view of the motor housing assembly of the present invention shown as a preferred embodiment.
Figure 5:
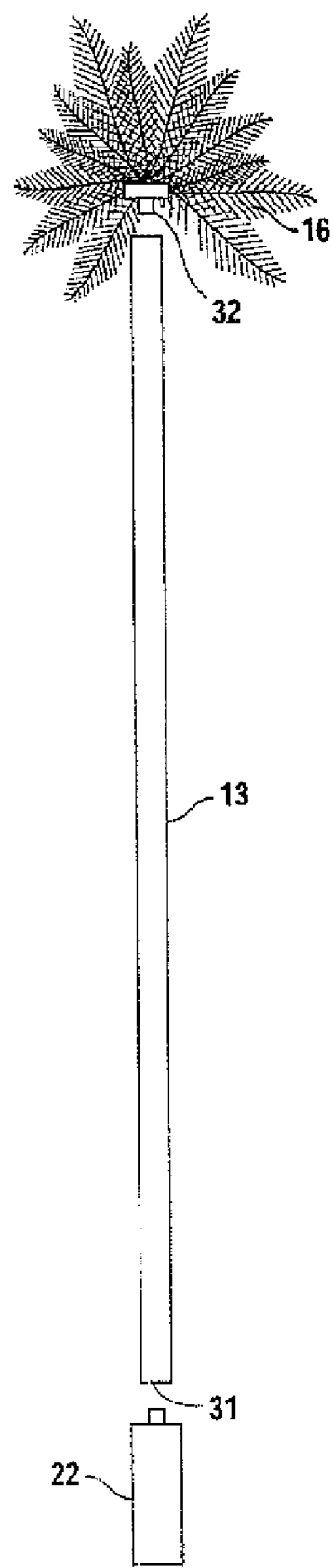
FIG. 5 is a side plan view of the spindle, shaft and attractant components highlighting their snap fit connectivity.

As a preferred embodiment, a motor is installed within offset weighted element 20 In providing power to the motor within offset weighted element 20, leaf connectors 27 and 28 (FIG. 4) are established which engage element 26 when offset weighted element 20 is seated proximate to the top surface of power supply 21 (moved in the direction of the arrows of FIG. 3). In doing so, spindle 22 extends through opening 25 to enable offset weighted element 20 to spin within lower hemisphere 12 creating a somewhat erratic spinning and tilting motion to the spherical ball thus creating a suitable attractant toy.

Shaft 13 is provided as the support for attractant 16 The attractant can be any item which would occupy the attention of a pet cat during its erratic somewhat circular motion As illustrated, a bundle of feathers can be employed for this purpose As such when shaft 13 is connected to spindle 22 and the hollow spherical ball caused to turn, rotate and shift orientation as a result of the circular motion of offset weighted element 20, attractant 16 engages in significant swings from vertically extending longitudinal axis 15 It has been observed that cats find such motion virtually irresistible. In creating this motion, it is noted that neither spindle 22 nor shaft 13 actually rotate. Instead, it is the spherical ball which engages in the sought after motion that a cat would find highly desirable. Advantages inherent in such a configuration are the result of the simplicity of design in not having to create a rotating shaft and a robustness in construction for all of the movable parts causing the cat toy to engage in its sought after motion are internal to the spherical ball.

In implementing the present invention, the designer of its physical implementation can benefit from a good deal of discretion in determining the extent of movement of attractant 16. Specifically, design parameters include the offset weigh that is, the difference between expanded end 23 and contracted end 24 thereof, the speed in which the motor contained therein will move the weight about spindle 22, the length and stiffness of shaft 13, the combined weight of the battery housing and motor assembly situated in lower hemisphere 12 and the size and positioning of protrusions 17. Regarding the latter elements, it was found that by placing a plurality of protrusions, generally four or more, as shown about the outside surface of lower hemisphere 12, the tipping of shaft 13 to a horizontal orientation can be resisted; and the protrusions further add to the somewhat haphazard movement of the spherical ball during operation In other words, the size and speed of rotation of the weighted element, length of the shaft, size of the attractant and placement of the protrusions are selected to cause the attractant to move about axis 15 without being displaced from its vertical orientation when power is interrupted to the motor.

In order to add to the life and flexibility of this invention, it is proposed that shaft 13 have a releasable snap fit connector at interface 31 to spindle 22 and that attractant have a removable snap fit connector to shaft 13 at interface 32. In this way, as a cat engages the present toy and, as a result, degrades either shaft 13 or attractant 16, a pet owner can simply replace these elements without having to replace the entire assembly thus extending the life of the present pet toy almost indefinitely.

What is claimed is:

1. A cat toy comprising a hollow spherical shell having an opening configured therein, a power supply supported by the interior of said shell, and a spindle emanating from said power supply and extending toward said opening, an offset weighted element having a bore hole receiving said spindle and spinning about said spindle, and a motor rotating said offset weighted element about said spindle, a non-rotatable shaft for attachment to said spindle, wherein said motor is housed within said offset weighted element and sized to pass through said opening and an attractant supported by said shaft external to said hollow spherical shell.

2. The cat toy of claim 1 wherein said power supply comprises a battery pack.

3. The cat toy of claim 1 further comprising an on/off switch accessible externally to said hollow spherical shell.

4. The cat toy of claim 1 wherein said shaft is removably attached to said spindle.

5. The cat toy of claim 1 wherein said shaft and spindle are attached by of a snap fit connector.

6. The cat toy of claim 1 wherein said attractant is removably attached to said shaft.

7. The cat toy of claim 1 wherein said attractant and shaft are attached by way of a snap fit connector.

8. The cat toy of claim 1 wherein said hollow spherical shell is bisected into two detachable halves for gaining access to the interior thereof.

9. The cat toy of claim 1 wherein said hollow spherical shell is characterized as having a vertically extending axis passing through its geometric center and said opening such that in use, said opening resides uppermost of said hollow spherical shell.

10. The cat toy of claim 9 further comprising on the surface of said hollow shell, a plurality of protrusions proximate to said axis opposite from said opening.

11. The cat toy of claim 10 wherein the size and speed of said weighted element, length of said shaft, size of said attractant and placement of said protrusions are selected to cause said attractant to move about said axis without said axis being displaced from its vertical orientation when power is interrupted to said motor.

* * * * *